(12) United States Patent
Nishikawa et al.

(10) Patent No.: US 9,621,882 B2
(45) Date of Patent: Apr. 11, 2017

(54) CALIBRATION DEVICE, IMAGING DEVICE, CALIBRATION METHOD, AND METHOD FOR MANUFACTURING IMAGING DEVICE

(71) Applicant: Sharp Kabushiki Kaisha, Osaka-shi, Osaka (JP)

(72) Inventors: Masato Nishikawa, Osaka (JP); Hidenori Fujisawa, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/770,105

(22) PCT Filed: Jan. 29, 2014

(86) PCT No.: PCT/JP2014/051971
§ 371 (c)(1),
(2) Date: Aug. 25, 2015

(87) PCT Pub. No.: WO2014/148115
PCT Pub. Date: Sep. 25, 2014

(65) Prior Publication Data
US 2016/0007017 A1 Jan. 7, 2016

(30) Foreign Application Priority Data
Mar. 22, 2013 (JP) .................. 2013-061032

(51) Int. Cl.
*H04N 17/00* (2006.01)
*G03B 5/00* (2006.01)
(Continued)

(52) U.S. Cl.
CPC ............ *H04N 17/002* (2013.01); *G03B 5/00* (2013.01); *H04N 5/2252* (2013.01);
(Continued)

(58) Field of Classification Search
CPC ........... H04N 5/23258; H04N 5/23248; H04N 5/23287; H04N 5/2254; H04N 17/002
(Continued)

(56) References Cited

U.S. PATENT DOCUMENTS 5,696,999 A 12/1997 Matsushima et al.
2004/0136704 A1* 7/2004 Usui .................. G03B 5/00
396/55

FOREIGN PATENT DOCUMENTS

JP 09-080559 A 3/1997
JP 2007-101671 A 4/2007
(Continued)

OTHER PUBLICATIONS

Official Communication issued in International Patent Application No. PCT/JP2014/051971, mailed on Apr. 22, 2014.

*Primary Examiner* — Antoinette Spinks
(74) *Attorney, Agent, or Firm* — Keating & Bennett, LLP

(57) ABSTRACT

In order to provide a calibration device and the like suitable for image stabilization, a calibration device (1) is provided with a correction lens (11), an actuator coil (13), and a control section (20) for calibrating a center (p) of a movable range (R) of the correction lens (11) to a center position (pa) between a left rated output position (α) and a right end position (b), the left rated output position (α) being a position closest to a left end position (a) in a range where the correction lens (11) is movable when a current within a rated current is caused to flow in the actuator coil (13).

5 Claims, 9 Drawing Sheets

(51) Int. Cl.
*H04N 5/232* (2006.01)
*H04N 5/225* (2006.01)

(52) U.S. Cl.
CPC ....... *H04N 5/2254* (2013.01); *H04N 5/23258* (2013.01); *H04N 5/23287* (2013.01); *G03B 2205/0015* (2013.01); *G03B 2205/0069* (2013.01)

(58) Field of Classification Search
USPC .................................................... 348/209.99
See application file for complete search history.

(56) References Cited

FOREIGN PATENT DOCUMENTS

| | | | | |
|---|---|---|---|---|
| JP | 2007101671 | A | * | 4/2007 |
| JP | 2012-013778 | A | | 1/2012 |
| JP | 2012013778 | A | * | 1/2012 |

* cited by examiner

F I G. 2
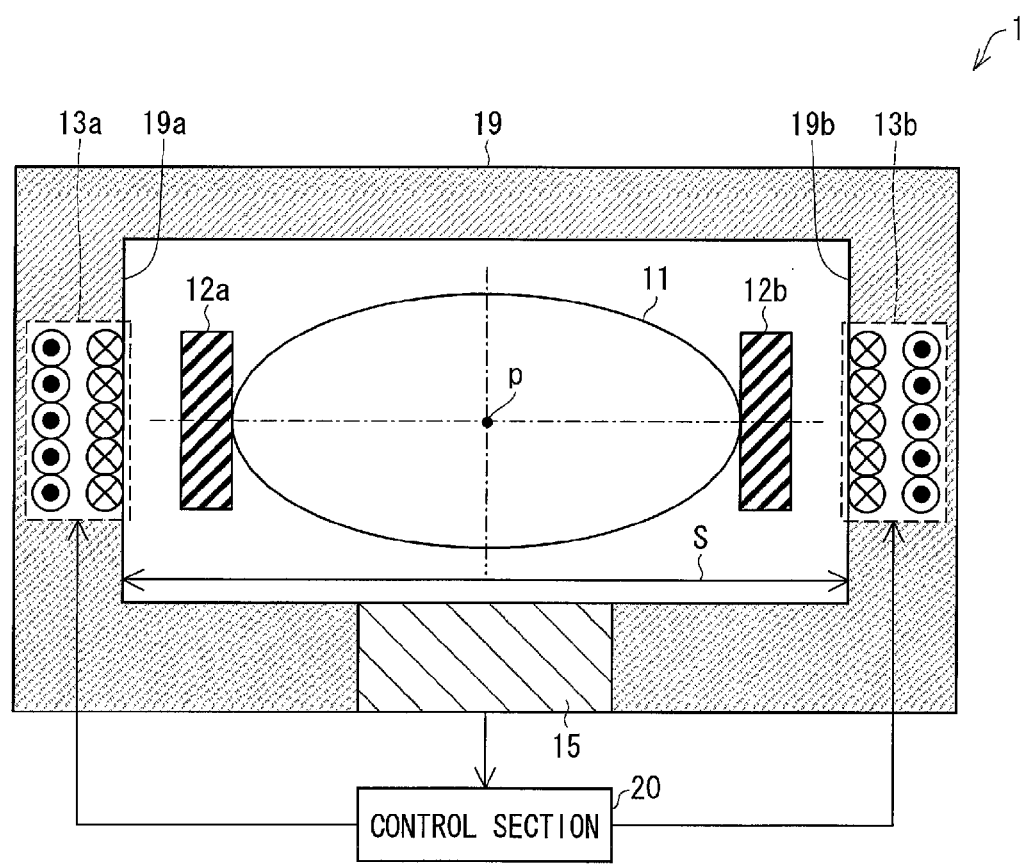

CALIBRATION DEVICE, IMAGING DEVICE, CALIBRATION METHOD, AND METHOD FOR MANUFACTURING IMAGING DEVICE

TECHNICAL FIELD

The present invention relates to (i) a calibration device for calibrating a movable range of an optical element such as a correction lens, (ii) an imaging device including the calibration device, and the like.

BACKGROUND ART

In an imaging device such as a camera, a digital camera, a camcorder, and binoculars, a captured image may be disturbed by user's hand shaking. For such an imaging device, there has been developed an image stabilization function which reduces an adverse effect of user's hand shaking on an imaging function. A method for realizing the image stabilization function encompasses a module shift method, a lens shift method, a sensor shift method, and the like. Among these, the lens shift method corrects an optical axis of an optical system, by (i) incorporating a correction lens having a vibration gyro mechanism and the like into an imaging device and (ii) moving the correction lens in a direction that allows a vibration due to user's hand shaking to be canceled. This method makes it possible to control fluctuations of light that reaches a light receiving surface (e.g., a film or an image sensor). This consequently makes it possible to reduce the adverse effect of user's hand shaking on the imaging function. The lens shift method is superior to the module shift method and the like in terms of smaller size and smaller thickness.

However, the lens shift method has a problem in that in some cases, an initial position of the correction lens to be used for an optical axis correction does not coincide with a center of a correction mechanism in which the correction lens is stored. Such non-coincidence between the initial position of the correction lens and the center of the correction mechanism occurs due to, for example, (a) variations of spring constants or the like of members supporting the correction lens, (b) a mounting error which occurs during incorporation of the correction lens and the like into the imaging device, (c) external force which acts on the imaging device in which the correction lens and the like are incorporated, (d) an aging deterioration, and so forth.

FIG. 7 is a view illustrating a state in which an initial position of a correction lens 1011 does not coincide with a center of a correction mechanism (space S) in which the correction lens 1011 is stored, and is also a view illustrating a calibration device 1000 and a calibration method according to a conventional technique. As illustrated in FIG. 7, the calibration device 1000 includes the correction lens 1011 and a drive device 1013 which moves the correction lens 1011. Note that the calibration device 1000 may use, as the drive device 1013, a drive device of another device (e.g., an imaging device) used together with the calibration device. The correction lens 1011 is stored in the space S between a left end 19a and a right end 19b. The correction lens 1011 moves within a movable range R which is horizontally symmetrical with respect to a center p, so as to cancel a vibration due to hand shaking. The center p is an initial position of a center of the correction lens 1011. As described above, the center p (initial position) of the movable range R of the correction lens 1011 does not coincide with a center c of the space S (correction mechanism) in which the correction lens 1011 is stored. In this case, the drive device 1013 does not move the correction lens 1011 away from the center p beyond a boundary position q which is a position horizontally symmetrical to a right end position b with respect to the center p. That is, the non-coincidence between the initial position (center p) of the correction lens 1011 and a center (center c) of the correction mechanism in which the correction lens 1011 is stored produces an unusable region Q (a region between a left end position a and the boundary position q) to which the drive device 1013 does not move the correction lens 11. Further, the drive device 1013 cannot move the correction lens 1011 with an output beyond a rated output of the drive device 1013. Accordingly, in practice a range within which the drive device 1013 can move the correction lens 1011 may be limited to a rated output range Ri (a range between a left rated output position α and a right rated output position β) narrower than the movable range R.

In order to reduce such an unusable region Q, Patent Literature 1 discloses an image stabilization device which allows a camera itself to automatically adjust an adjustment value to be used for calculating a correction lens position from outputs of respective correction lens position detection circuits at both ends of a movable range of a correction lens. FIG. 8 is a view illustrating a calibration device 2000 and a calibration method according to a conventional technique disclosed in Patent Literature 1. The calibration device 2000 is similar in configuration to the calibration device 1000 illustrated in FIG. 7. However, the calibration device 2000 is different from the calibration device 1000 in that the calibration device 2000 includes a drive device 2013 which has a rated output range Ri containing a space S as illustrated in FIG. 8. Provided with the drive device 2013, the calibration device 2000 moves the correction lens from a left end position a to a right end position b and thereby carries out calibration so that a center p coincides with a center c. Note that, in FIG. 8, a center p after calibration is indicated as "pa" and a movable range R after calibration is indicated as "Ra". That is, Patent Literature 1 discloses a method for calibrating an initial position of the correction lens 1011 by (i) causing the drive device 2013 to move the correction lens 1011 from a left end 19a to a right end 19b and (ii) detecting positions of the correction lens 1011 during the movement of the correction lens 1011 so as to detect left and right end positions (the left end position a and the right end position b) of the space S in which the correction lens 1011 is stored.

CITATION LIST

Patent Literature

[Patent Literature 1]
  Japanese Patent Application Publication
  *Tokukaihei*, No. 9-80559 (Publication date: Mar. 28, 1997)

SUMMARY OF INVENTION

Technical Problem

However, in a case where a portion of a designed movable range of a correction lens is in an unusable region, an output of a drive device may exceed a rated output when the drive device attempts to move the correction lens to a designed position. FIG. 9 is a view illustrating such a state and is also a view illustrating a problem of the calibration device 2000 and the calibration method according to the conventional technique disclosed in Patent Literature 1. Here, the drive device 2013 does not necessarily have the rated output range Ri containing the space S as illustrated in FIG. 8, but may have a rated output range Ri which does not contain the space S as illustrated in FIG. 9. In FIG. 9, the rated output range Ri has a left rated output position a closer to a center p than to a left end position a. In this case, a portion of the unusable region Q and a portion of the rated output range Ri overlap with each other. This produces, within the unusable region Q, a region T (a region between the left rated output position α and a boundary position q) to which the drive device 1013 still can move the correction lens 1011. Further, in the calibration device 2000, in a case where the drive device 2013 attempts to move the correction lens 1011 to the left end position a beyond the rated output position α so as to reduce the unusable region Q, the output of the drive device 2013 exceeds the rated output.

In view of the above problem, an object of the present invention is to provide a calibration device and the like suitable for image stabilization, which calibration device and the like can (i) move, with an output within a rated output of a drive device, an optical element such as a correction lens so as to cancel a vibration due to hand shaking and (ii) also make an unusable region after calibration smaller than that before the calibration.

Solution to Problem

In order to solve the above problem, a calibration device according to an aspect of the present invention is a calibration device which (i) receives positional information (information indicative of a position) of an optical element detected by a position detection device and (ii) calibrates a movable range of the optical element moving, with driving force provided by a drive device, between a first end and a second end symmetrical to the first end with respect to a reference point, the movable range being calibrated on the basis of positional information of the optical element, the calibration device including: a center position calibration section for calibrating a center of the movable range of the optical element to a center position between a first position and a second position, the first position being a position closest to the first end in a range where the optical element is movable with an output within a rated output of the drive device, the second position being indicated by the positional information detected by the position detection device and being a position at which the correction lens came in contact with the second end.

Further, a calibration method according to an aspect of the present invention is a calibration method for calibrating a movable range of an optical element moving, with driving force provided by a drive device, between a first end and a second end symmetrical to the first end with respect to a reference point, the movable range being calibrated on the basis of positional information of the optical element, the positional information being detected at a position detection step, the calibration method including the steps of: (a) receiving the positional information; and (b) calibrating a center of the movable range of the optical element to a center position between a first position and a second position, the first position being a position closest to the first end in a range where the optical element is movable with an output within a rated output of the drive device, the second position being indicated by the positional information detected at the position detection step and being a position at which the optical element came in contact with the second end.

Furthermore, a method for producing an imaging device according to an aspect of the present invention is a method for producing an imaging device which (i) receives positional information of an optical element detected at a position detection step and (ii) calibrates a movable range of the optical element moving, with driving force provided by a drive device, between a first end and a second end symmetrical to the first end with respect to a reference point, the method including the steps of: (c) inspecting whether or not a center of the movable range of the optical element coincides with the reference point; and (d) in a case where it is found at the step (c) that the center of the movable range of the optical element does not coincide with the reference point, calibrating the center of the movable range of the optical element to a center position between a first position and a second position, the first position being a position closest to the first end in a range where the optical element is movable with an output within a rated output of the drive device, the second position being indicated by the positional information detected at the position detection step and being a position at which the optical element came in contact with the second end.

Advantageous Effects of Invention

According to an aspect of the present invention, it is possible to (i) move, with an output within a rated output of a drive device, an optical element such as a correction lens so as to cancel a vibration due to hand shaking and (ii) make an unusable region after calibration smaller than that before the calibration.

BRIEF DESCRIPTION OF DRAWINGS

FIG. 2 is a cross-sectional view illustrating a configuration of the calibration device illustrated in FIG. 1.

DESCRIPTION OF EMBODIMENTS

The following discusses in detail embodiments of the present invention.

[Embodiment 1]

The following discusses an embodiment of the present invention with reference to FIGS. 1 through 4.

<Configuration of Calibration Device 1>

Figure 1:
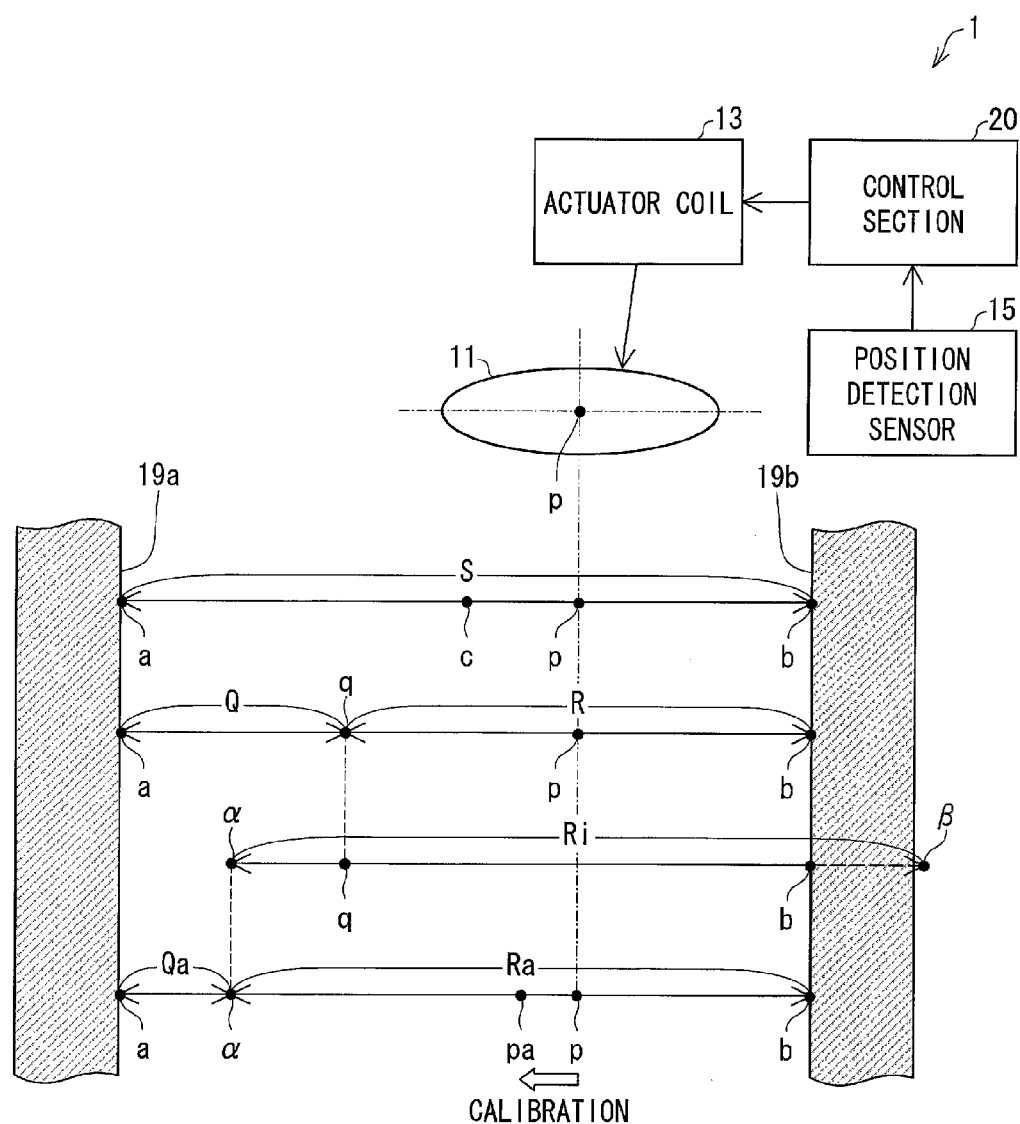
FIG. 1 is a view illustrating a calibration device and a calibration method according to Embodiment 1.

FIG. 1 is a view illustrating a calibration device 1 and a calibration method according to Embodiment 1. As illustrated in FIG. 1, the calibration device 1 is provided with a correction lens (optical element) 11, an actuator coil (drive device) 13, a position detection sensor (position detection device) 15, and a control section (center position calibration section) 20. With this configuration, it is possible to move the correction lens 11 so as to cancel a vibration due to hand shaking, by causing a current within a rated current to flow in the actuator coil 13. It is also possible to make an unusable region after calibration smaller than that before the calibration. The following discusses in detail each component of the calibration device 1.

(Correction Lens 11)

The correction lens 11 is incorporated into an imaging device or the like together with the actuator coil 13 which moves the correction lens 11, and moves so as to cancel a vibration. Accordingly, the correction lens 11 is used in order to reduce an adverse effect of hand shaking on an imaging function. The correction lens 11 is supported by a spring or the like and is stored in a space S having a certain size. Under action of force applied by the actuator coil 13, the correction lens 11 moves within the space S. The following discusses an embodiment in which the correction lens 11 moves within a one-dimensional space (range). However, a space within which the correction lens 11 moves is not limited to the one-dimensional space but can be a two-dimensional space or a three-dimensional space.

The space S, in which the correction lens 11 is stored, has a left end (first end) 19a and a right end (second end) 19b. Generally, an initial position of the correction lens 11 is designed so that a center p of a movable range R of the correction lens 11 coincides with a center (reference point) c of the space S in which the correction lens 11 is stored. However, in some cases, the center p does not coincide as designed with the center c due to (a) variations of spring constants or the like of members supporting the correction lens 11, (b) a mounting error which occurs during incorporation of the correction lens 11 and the like into the imaging device, (c) external force which acts on the imaging device in which the correction lens and the like are incorporated, (d) an aging deterioration, and so forth. In such a case where the center p does not coincide with the center c, a portion of a designed movable range (space S) of the correction lens 11 may be in an unusable region Q to which the correction lens 11 cannot be moved. FIG. 1 illustrates such a state. In this state, (i) the center p of the movable range R of the correction lens 11 does not coincide with the center (a center of the space S in which the correction lens 11 is stored) c between a left end position a and a right end position b, and (ii) it is not possible to move the correction lens 11 toward the left end 19a beyond a boundary position q.

Note that, in FIG. 1, the correction lens 11 is regarded as a point and positional relationships between the correction lens 11 and the left end 19a, between the correction lens 11 and the right end 19b, and the like. However, the correction lens 11 in practice has a shape having a certain size, and the positional relationships may vary in accordance with the shape of the correction lens 11.

(Actuator Coil 13)

The actuator coil 13 is incorporated into the imaging device or the like together with the correction lens 11. In the actuator coil 13, a current is caused to flow in a coil, so that a magnetic field is generated. Here, in a case where the correction lens 11 is combined with a magnet, it is possible to move the correction lens 11 to a position corresponding to intensity distribution of the magnetic field, by causing the magnetic field to act on the magnet.

In a case where a portion of the designed movable range (space S) of the correction lens 11 is in the unusable region Q, a current caused to flow in the actuator coil 13 may exceed a rated current when the actuator coil 13 attempts to move the correction lens 11 to a designed position. The following discusses such a case.

First, a rated output range Ri means a range, within which the correction lens 11 can move when the correction lens 11 is moved by causing a current within the rated current to flow in the actuator coil 13. In this case, a left rated output position α is a position furthest from the center p in a range where the correction lens 11 can move when the correction lens 11 is moved toward the left end 19a by causing a current within the rated current to flow in the actuator coil 13. Meanwhile, a right rated output position β is a position furthest from the center p in a range where the correction lens 11 can move when the correction lens 11 is moved toward the right end 19b by causing a current within the rated current to flow in the actuator coil 13. In other words, the left rated output position α is a position closest to the left end 19a in a range where the correction lens 11 can move when a current within the rated current is caused to flow in the actuator coil 13 which moves the correction lens 11. Here, the left rated output position α is closer to the center p than to the left end 19a because the center p does not coincide with the center c. In a case where the correction lens 11 is caused to move away from the center p beyond the left rated output position α, a current flowing in the actuator coil 13 exceeds the rated current. Note that the correction lens 11 comes in contact with the right end 19b at the right end position b, so that the correction lens 11 no longer moves away from the center p beyond the right end position b.

The calibration device 1 uses an actuator coil for the purpose of moving the correction lens 11. However, a device for moving the correction lens 11 is not limited to the actuator coil. The calibration device 1 can alternatively use, for example, a linear motor, a stepping motor, or the like. In a case where any one of these motors is used for moving the correction lens 11, the need for combining the correction lens 11 with a magnet is eliminated. This makes it possible to move the correction lens 11 independently.

(Position Detection Sensor 15 and Control Section 20)

The position detection sensor 15 is a position detection device which detects a position of the correction lens 11 in the space S. The control section 20 is a center position calibration section which calibrates the center p to a center position pa between the left rated output position α and the right end position b. FIG. 2 is a cross-sectional view illustrating a configuration of the calibration device 1 illustrated in FIG. 1. As illustrated in FIG. 2, the correction lens 11 and magnets 12a and 12b combined with the correction lens 11 are stored in a space which is enclosed by a housing 19 of the calibration device 1 and are provided between the left end 19a and the right end 19b. Further, the housing 19 is provided with actuator coils 13a and 13b and the position detection sensor 15. Here, the actuator coils (drive device) 13a and 13b are included in the actuator coil 13 illustrated in FIG. 1. The control section 20 is connected with the position detection sensor 15 so that the control section 20 can obtain positional information (information indicative of a position) of the correction lens 11 detected by the position detection sensor 15.

The housing 19 in practice has a three-dimensional expanse. Assume here that, in FIG. 2, a direction in which two-directional arrows indicative of the space S extend is an X-axis direction and that a direction of depth perpendicular to a paper surface of FIG. 2 is a Y-axis direction. Then, the position detection sensor 15 is provided so as to be able to detect a position in the two directions, i.e., the X-axis direction and the Y-axis direction. Moreover, four actuator coils are provided on the total of four surfaces of the space S, respectively, two of which four surfaces are two end surfaces vertical to the X-axis, and the other two of which four surfaces are two end surfaces vertical to the Y-axis. Further, four magnets are provided so as to correspond to the four actuator coils, respectively.

The control section 20 is connected with the actuator coils 13a and 13b and indicates an amount of current which is to flow in each of the actuator coils. In each of the actuator coils, thus indicated amount of current is caused to flow, so that a magnetic field is generated. The actuator coils can then move the correction lens 11 to a position corresponding to intensity distribution of the above generated magnetic field, by causing the magnetic field to act on the magnets 12a and 12b combined with the correction lens 11. That is, the control section 20 can control a shift direction and a shift amount of the correction lens 11 by indicating the amount of the current which is to flow in each of the actuator coils.

Note that the control section 20 can control the shift direction and the shift amount of the correction lens 11 so that a vibration detected by a vibration gyro (vibration measurement device) or the like is canceled.

In the above description, the control section 20 indicates the current amount but is not limited to this configuration. Alternatively, the control section 20 can be configured to indicate, to another component, a voltage value, a resistance value, the shift direction or the shift amount of the correction lens 11, or the like, so that the another component having received the indication determines, in accordance with the indication, the amount of the current to be caused to flow in each of the actuator coils. That is, the control section 20 can utilize an amount of any parameter for such an indication which is intended to control the shift direction and the shift amount of the correction lens 11, as long as the correction lens is moved with an output within a rated output of the actuator coils.

<Operation of Calibration Device 1 and Calibration Method>

With use of the control section 20, the calibration device 1 having the above configuration operates so as to calibrate the center p of the movable range of the correction lens 11 to the center position pa between (i) the left rated output position α closest to the left end 19a in a range where the correction lens 11 can move when a current within a the rated current is caused to flow in the actuator coil 13 and (ii) the right end position b. The use of the calibration device 1 operating as described above or the calibration method makes it possible to move (calibrate) the correction lens 11 to a center (center position pa) of the movable range so that a vibration due to hand shaking is cancelled, by causing a current within the rated current to flow in the actuator coil 13. The use of the calibration device 1 or the calibration method also makes it possible to reduce the unusable region Q before calibration, to an unusable region Qa (a range between the left end position a and the left rated output position α), by causing the center of the movable range of the correction lens 11 to approach the center of the space in which the correction lens 11 is stored. This reduction of the unusable region Q can extend the movable range R of the correction lens before calibration, up to a movable range Ra (a range between the left rated output position α and the right end position b). Therefore, it is possible to move the correction lens 11 so as to cancel a greater vibration.

<Effects of Calibration Device 1 and Calibration Method>

The use of the calibration device 1 or the calibration method of Embodiment 1 makes it possible to move the correction lens 11 so that a vibration due to hand shaking is canceled, by causing a current within the rated current to flow in the actuator coil 13. The use of the calibration device 1 or the calibration method also makes it possible to reduce the unusable region Q before calibration, to the unusable region Qa.

Note that the calibration device 1 can be configured to correct an optical axis by moving a plurality of correction lenses. This configuration makes it possible (i) to move the plurality of correction lenses with an output within the rated output of the drive device so as to cancel a vibration due to various types of hand shaking and (ii) also to make the unusable region after calibration smaller than that before calibration.

<Usage Embodiment of Calibration Device 1>

(Configuration, Operation, and Effects of Imaging Device 100)

Figure 3:
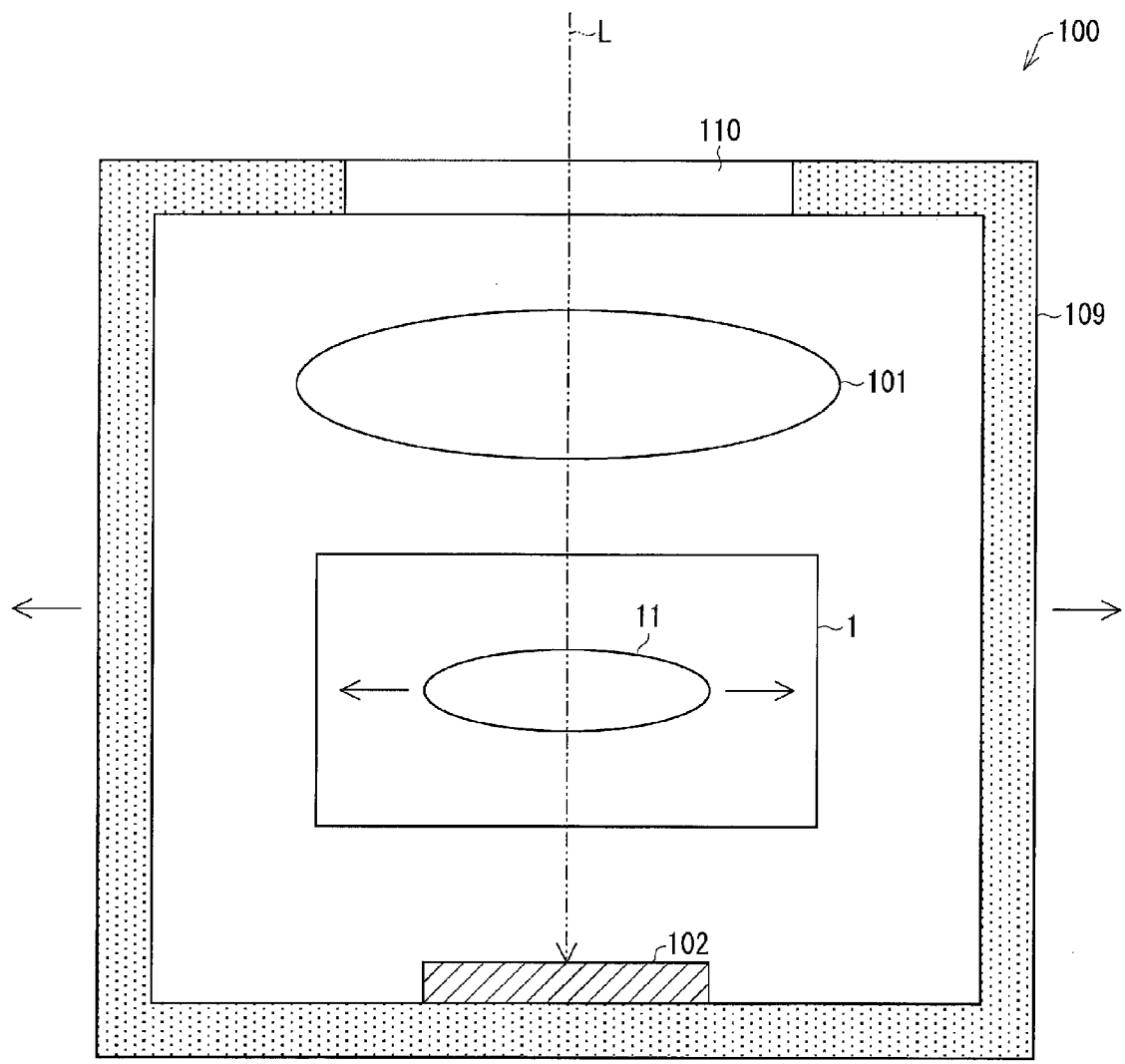
FIG. 3 is a cross-sectional view illustrating a configuration of an imaging device using the calibration device illustrated in FIG. 1.

FIG. 3 is a cross-sectional view illustrating a configuration of an imaging device 100 utilizing the calibration device 1 illustrated in FIG. 1. As illustrated in FIG. 3, the imaging device 100 includes a housing 109, and a lens (optical system) 101, the calibration device 1, and an image sensor 102 which are provided in a space surrounded by the housing 109.

The lens 101 is an optical system which guides light L from outside onto the image sensor 102. Note that FIG. 3 illustrates a configuration in which the imaging device 100 includes a single lens only, but the imaging device 100 is not limited to this configuration. Alternatively, the imaging device 100 can include a plurality of lenses or an optical system including an optical element such as a prism except a lens.

The housing 109 is provided with a window 110 which transmits the light L. The imaging device 100 captures an external object by (i) taking in the light L through the window 110 and (ii) guiding this light L onto the image sensor 102 through the lens 101 and the correction lens 11 provided in the calibration device 1.

When the imaging device 100 having the above configuration is used, a user holds the housing 109. Then, the imaging device 100 vibrates, due to user's hand shaking, for example, in a direction indicated by arrows provided on left and right sides of the housing 109 in FIG. 3. In this case, the calibration device 1 moves the correction lens 11 in a direction indicated by arrows provided on right and left sides of the correction lens 11 in FIG. 3 so as to cancel the vibration. Thus, as in a case where there is no vibration, the light L is guided onto the image sensor 102 even if the vibration due to user's hand shaking acts on the imaging device 100 to a certain extent.

Note that the calibration device 1 (control section 20) can control a shift direction and a shift amount of the correction lens 11 so that a vibration detected by a vibration gyro (vibration measurement device) or the like is canceled.

That is, the imaging device 100 has a calibration function which can (i) move the correction lens 11 so that the vibration due to hand shaking is cancelled, by causing a current within the rated current to flow in the actuator coil 13 (see FIG. 1) and (ii) reduce the unusable region Q illustrated in FIG. 1 so that an unusable region after calibration is smaller than that before the calibration. Therefore, the imaging device 100 can reduce an adverse effect of hand shaking on an imaging function.

In FIG. 3, the light L having passed through the lens 101 is caused to pass through the calibration device 1 (correction lens 11), but the present invention is not limited to this configuration. Alternatively, the imaging device 100 can be configured to cause the light L having passed through the calibration device 1 to pass through the lens 101. In other words, the calibration device 1 can be provided at a position at which the lens 101 is provided in FIG. 3 while the lens 101 can be provided at a position at which the calibration device is provided in FIG. 3.

Further, the imaging device 100 can be configured such that the calibration device 1 is provided in the vicinity of the image sensor 102 or, alternatively, the calibration device 1 is combined with the image sensor 102. Typically, as the image sensor 102, a complementary metal oxide semiconductor (CMOS), a charge coupled device (CCD), or the like is used for the purpose of converting the light L into an electric signal. However, noise may be superposed on the electric signal converted from the light L, due to an increase in temperature of such a semiconductor or a device. Further, since the actuator coil 13 moves the correction lens 11 by causing a current to flow in the coil of the actuator coil 13, electric resistance of the coil causes heat. However, the calibration device 1 can reduce the current flowing in the actuator coil 13 so that the current is within the rated current. This makes it possible to reduce excessive heat generation caused by electric resistance in the calibration device 1. Accordingly, the calibration device 1 can reduce an adverse effect of heat generation of the actuator coil 13 on the imaging function. This makes it possible to provide the calibration device 1 in the vicinity of the image sensor 102 or to combine the calibration device 1 with the image sensor 102. This consequently leads to a smaller size and/or a smaller thickness of the imaging device 100.

(Method for Producing Imaging Device and Effects of Method)

Figure 4:
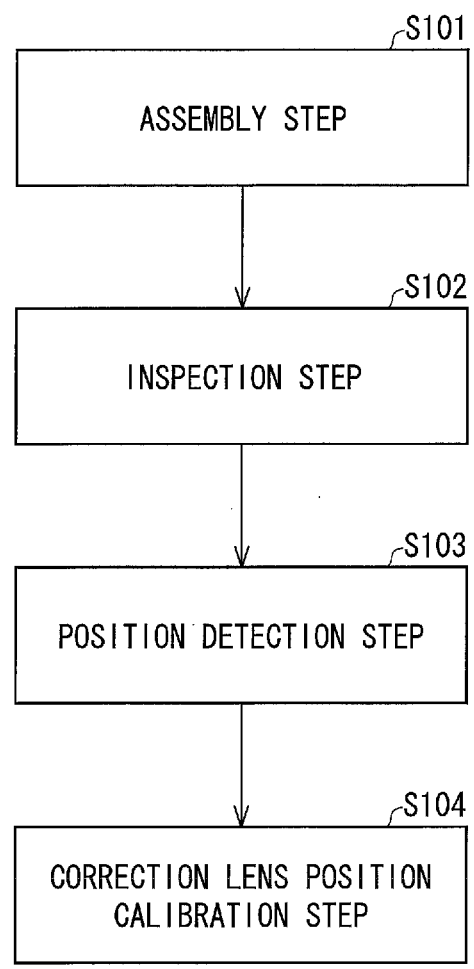
FIG. 4 is a view illustrating a method for producing the imaging device according to Embodiment 1.

FIG. 4 is a view illustrating a method for producing an imaging device according to Embodiment 1. As illustrated in FIG. 4, the method for producing the imaging device includes an assembly step S101, an inspection step S102, a position detection step S103, and a correction lens position calibration step (center position calibration step) S104.

At the assembly step S101, components of the imaging device are assembled. The components of the imaging device here includes: an image sensor; an optical system (e.g., a lens) which guides light from outside onto the image sensor; a correction lens which is moved so as to correct an optical axis of the optical system and stored in a space between a first end and a second end; and a drive device which moves the correction lens. Next, at the inspection step S102, the imaging device assembled at the assembly step S101 is inspected as to whether or not a center of a movable range of the correction lens coincides with a center of the space in which the correction lens is stored. At the position detection step S103, in a case where the centers do not coincide with each other at the inspection step S102 (in a case where a result of the inspection at the inspection step S102 reveals that the centers do not coincide with each other), a position where the correction lens came in contact with the second end is detected. At the correction lens position calibration step S104, in a case where the centers do not coincide with each other at the inspection step S102, the center of the movable range of the correction lens is calibrated to a center position between (i) a position closest to the first end in a range where the correction lens can move with an output within a rated output of the drive device and (ii) the second end.

The use of the production method including the described above steps makes it possible to produce an imaging device that can (i) move a correction lens with an output within a rated output of a drive device so as to cancel a vibration due to hand shaking, (ii) also make an unusable region after calibration smaller than that before the calibration, and (iii) in addition, reduce an adverse effect of hand shaking on an imaging function.

[Embodiment 2]

Figure 5:
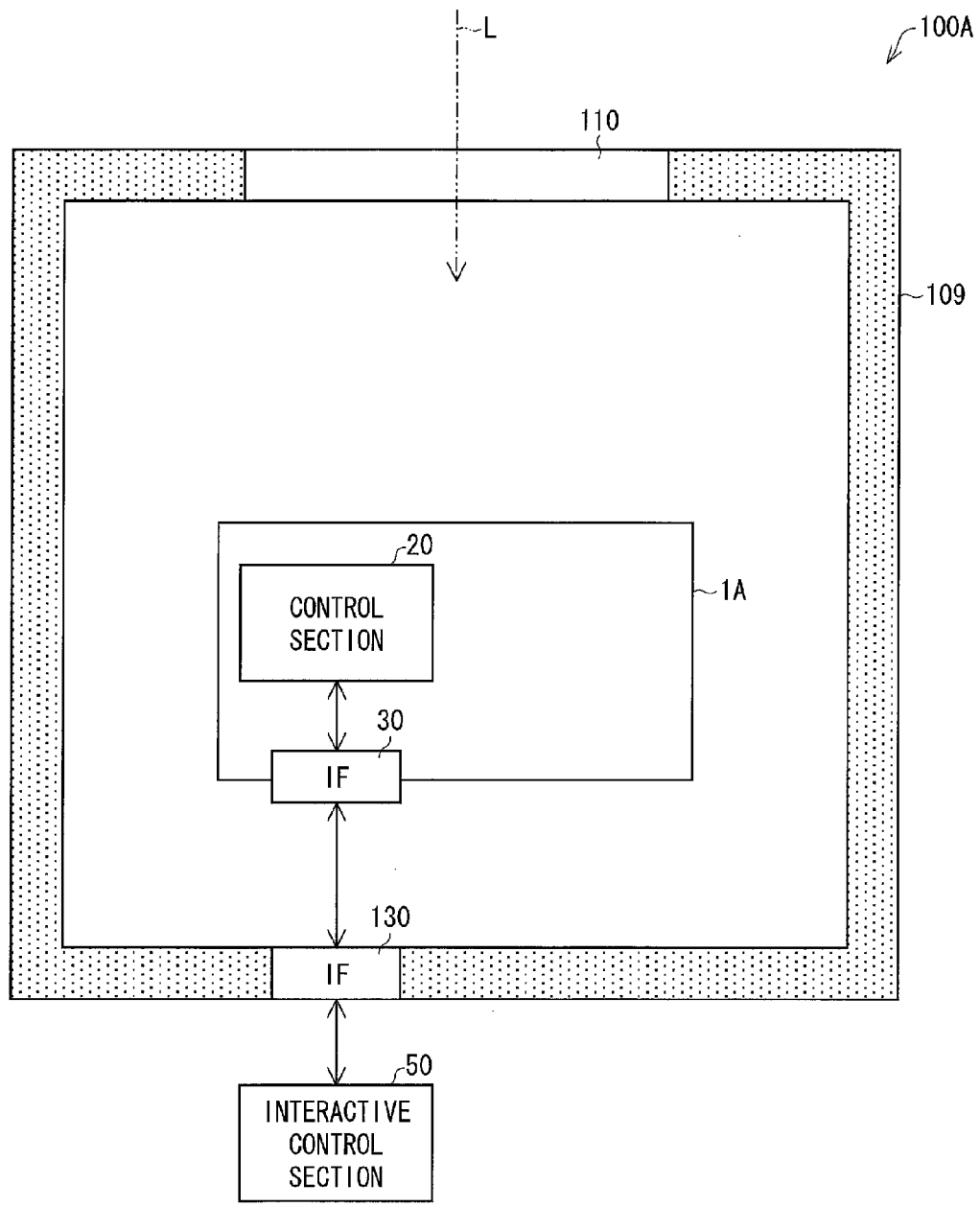
FIG. 5 is a cross-sectional view illustrating a configuration of an imaging device and a calibration device according to Embodiment 2.

The following discusses another embodiment of the present invention with reference to FIG. 5. For convenience, members having functions identical to those of members described in the Embodiment 1 are given the same reference numerals, respectively. Thus, descriptions of such members are omitted here.

<Configurations, Operations, and Effects of Imaging Device 100A and Calibration Device 1A>

FIG. 5 is a cross-sectional view illustrating configurations of an imaging device 100A and a calibration device 1A according to Embodiment 2. The imaging device 100A is similar in configuration to the imaging device 100 illustrated in FIG. 3. However, the imaging device 100A is different from the imaging device 100 in that the imaging device 100A further includes an interactive control section (calibration instruction information generation section) 50 and an interface 130 which connects the interactive control section 50 with the calibration device 1A, as illustrated in FIG. 5. Further, the calibration device 1A is similar in configuration to the calibration device 1 illustrated in FIG. 1. However, the calibration device 1A is different from the calibration device 1 in that the calibration device 1A further includes an interface 30 which connects the interactive control section 50 with the control section 20. Note that, in FIG. 5, the interface is indicated as "IF". The interactive control section 50 generates information which instructs the control section 20 to calibrate a center of a movable range of a correction lens provided in the calibration device 1A.

According to the above configuration, the calibration device 1A can receive the information generated by the interactive control section 50, via the interface 30 from outside, and can calibrate the center of the movable range of the correction lens.

Here, the interactive control section 50 can have, in addition to a function to generate instruction information for the control section 20, an interactive function which allows (i) obtaining, from the control section 20, information indicative of whether or not it is necessary to calibrate the center of the movable range of the correction lens and providing thus obtained information to a user who operates the interactive control section 50 and/or (ii) obtaining information from the control section 20 as well as supplying information to the control section 20, upon receipt of an instruction from a user.

That is, the center of the movable range of the correction lens may not coincide as designed with a center of a space in which the correction lens is stored, due to (a) variations of spring constants or the like of members supporting the correction lens, (b) a mounting error which occurs during incorporation of the correction lens and the like into the imaging device 100A, (c) external force which acts on the imaging device 100A in which the correction lens and the like are incorporated, (d) an aging deterioration, or the like. Even in such a case where the center of the movable range of the correction lens does not coincide as designed with the center of the space, a user of the imaging device 100A or the like in which the calibration device 1A is incorporated can externally operate the calibration device 1A, so as to (i) move the correction lens with an output within a rated output of the drive device and thereby cancel a vibration due to hand shaking, and (ii) also make an unusable region after calibration smaller than that before the calibration.

[Embodiment 3]

Figure 6:
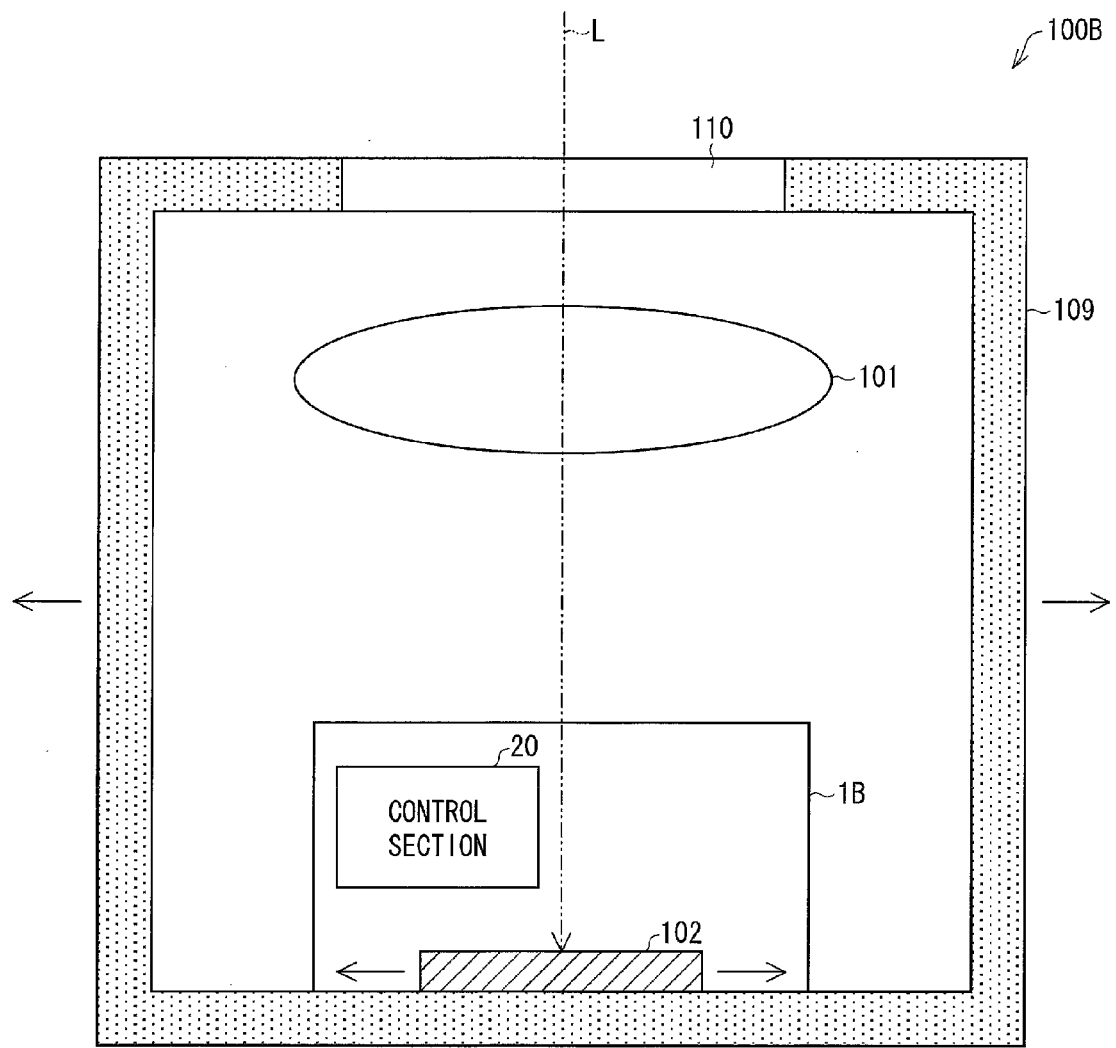
FIG. 6 is a cross-sectional view illustrating a configuration of an imaging device and a calibration device according to Embodiment 3.
Figure 7:
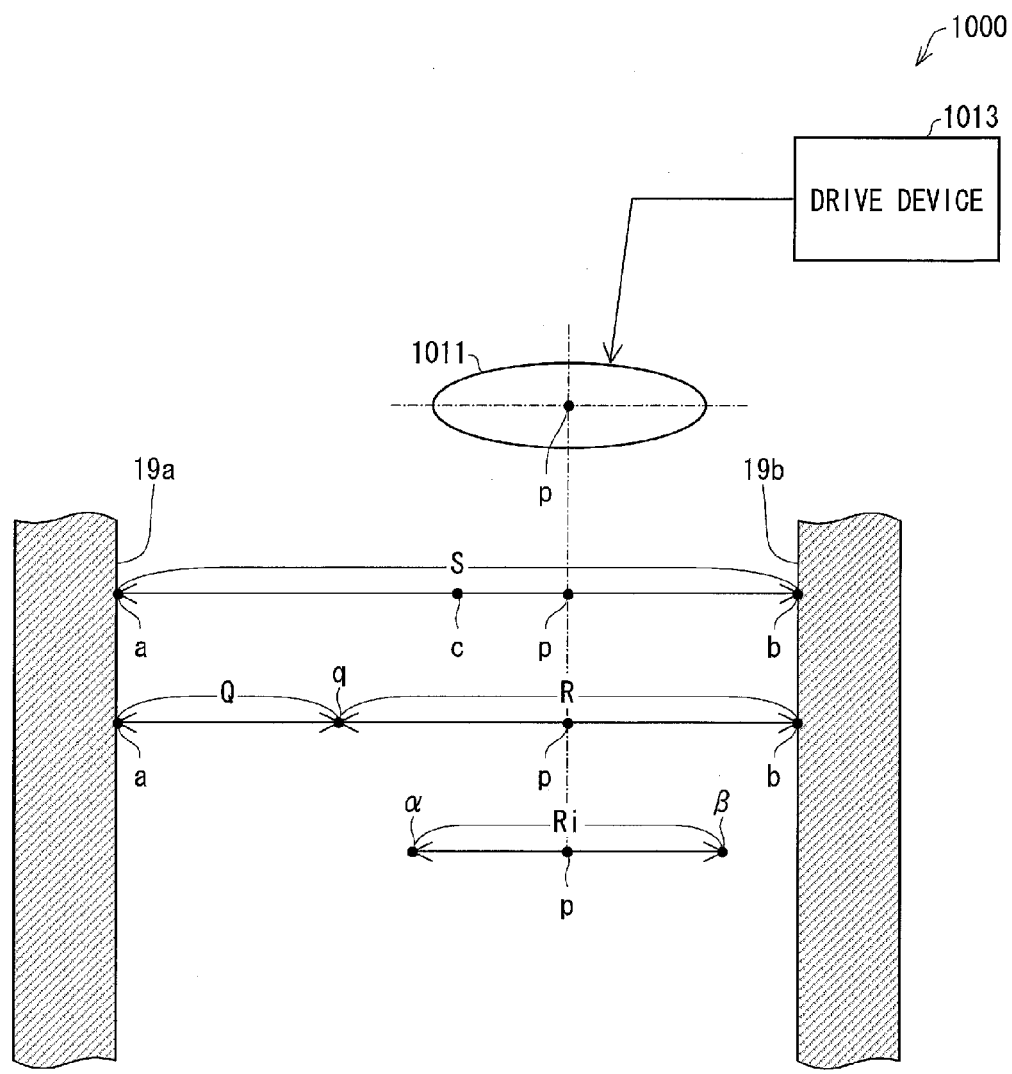
FIG. 7 is a view illustrating a calibration device and a calibration method according to a conventional technique.
Figure 8:
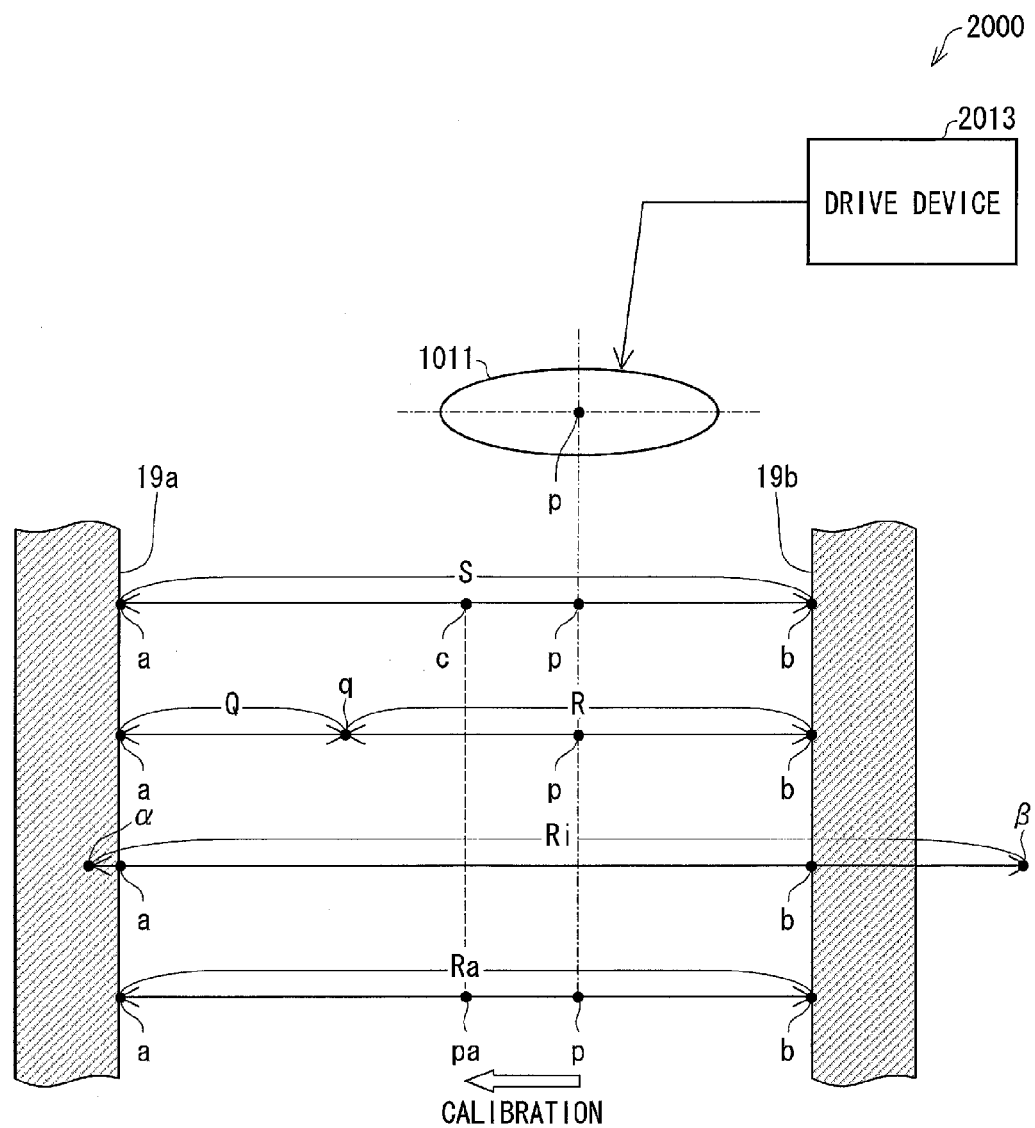
FIG. 8 is a view illustrating a calibration device and a calibration method according to a conventional technique.
Figure 9:
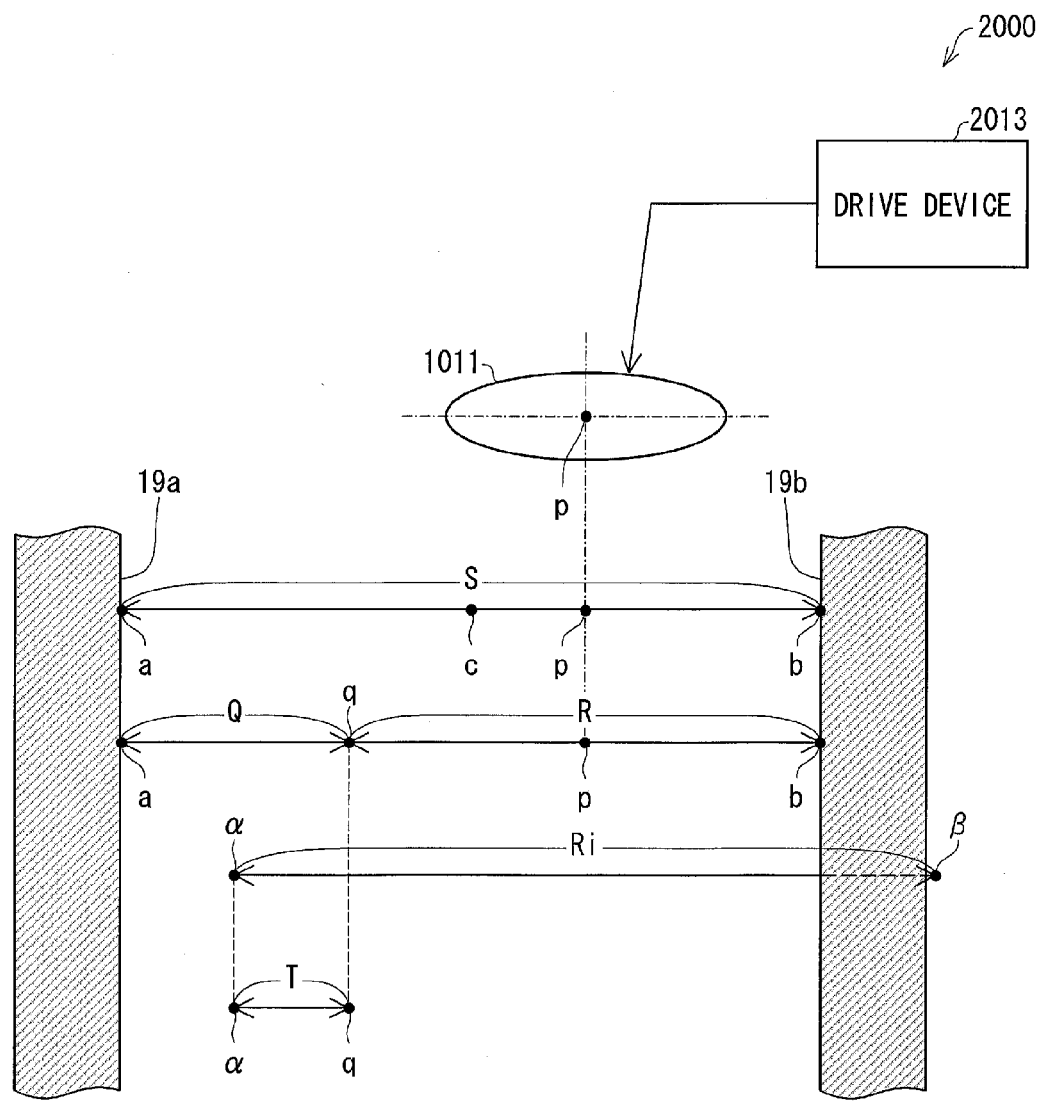
FIG. 9 is a view illustrating a problem of a calibration device and a calibration method according to a conventional technique.

The following discusses still another embodiment of the present invention with reference to FIG. 6. For convenience, members having functions identical to those of the members described in Embodiments 1 and 2 are given the same reference numerals, respectively. Thus, the descriptions of such members are omitted here.

<Configurations, Operations, Effects of Imaging Device 100B and Calibration Device 1B>

FIG. 6 is a cross-sectional view illustrating configurations of an imaging device 100B and a calibration device 1B according to the present embodiment. The imaging device 100B is similar in configuration to the imaging device 100 illustrated in FIG. 3, and the calibration device 1B is a similar in configuration to the calibration device 1 illustrated in FIG. 3. However, the calibration device 1B is different from the calibration device 1 in that the calibration device 1B moves not a correction lens but an image sensor (optical element) 102 as illustrated in FIG. 6.

That is, the calibration device 1B includes the image sensor 102 stored in a space between a first end and a second end, a drive device (not illustrated) which moves the image sensor 102, and a control section 20 which calibrates a center of a movable range of the image sensor 102 to a center position between (i) a position closest to the first end in a range where the image sensor 102 can move with an output within a rated output of the drive device and (ii) the second end.

When the imaging device 100B having the above configuration is used, a user holds the housing 109. Then, the imaging device 100B vibrates, due to user's hand shaking, for example, in a direction indicated by arrows provided on left and right sides of the housing 109 in FIG. 6. In this case, the calibration device 1B moves the image sensor 102 in a direction indicated by arrows provided on right and left sides of the correction lens 11 in FIG. 6 so as to cancel the vibration. Thus, as in a case where there is no vibration, the light L is guided onto the image sensor 102 even if the vibration due to user's hand shaking acts on the imaging device 100B to a certain extent.

According to the above configuration, the calibration device 1B can move the image sensor 102 with an output within the rated output of the drive device so as to cancel the vibration due to hand shaking and also can make an unusable region after calibration smaller than that before the calibration.

Here, the image sensor 102 can be an optical system which guides light to the image sensor 102 and the like, a correction mechanism which corrects an optical axis of the optical system, a correction lens provided in the correction mechanism, or the like. That is, the calibration device 1B can move the image sensor 102, the optical system, the correction mechanism, the correction lens, and the like with an output within the rated output of the drive device so as to cancel the vibration due to hand shaking, and also can make the unusable region after calibration smaller than that before the calibration.

Note that it is possible to combine (i) the calibration device 1, illustrated in FIG. 3, which corrects the optical axis by moving the correction lens with (ii) the calibration device 1B which corrects the optical axis by moving an optical element such as the image sensor except the correction lens. This makes it possible to (i) move the correction lens in combination with the image sensor at an output within the rated output of the drive device so as to cancel a vibration due to various hand shaking, and (ii) also make the unusable region after calibration smaller than that before the calibration.

[Example Realized by Software]

A control block(s) (specifically, the control section 20 and the interactive control section 50) of the calibration devices 1, 1A, and 1B, and of the imaging devices 100, 100A, and 100B can be realized by a logic circuit (hardware) provided in an integrated circuit (IC chip) or the like or can be alternatively realized by software as executed by a CPU (Central Processing Unit).

In the latter case, each of the calibration devices and each of the imaging devices includes a CPU that executes instructions of a program that is software realizing the foregoing functions; ROM (Read Only Memory) or a storage device (each referred to as "storage medium") in which the program and various kinds of data are stored so as to be readable by a computer (or a CPU); and RAM (Random Access Memory) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Main Points]

Each of calibration devices 1 and 1A according to Aspect 1 of the present invention is a calibration device which (i) receives positional information (information indicative of a position) of an optical element (correction lens 11, image sensor 102) detected by a position detection device (position detection sensor 15) and (ii) calibrates a movable range R of the optical element moving, with driving force provided by a drive device (actuator coil 13), between a first end (left end 19a) and a second end (right end 19b) symmetrical to the first end with respect to a reference point (center c), the movable range being calibrated on the basis of the positional information of the optical element, the calibration device including: a center position calibration section for calibrating a center p of the movable range of the optical element to a center position pa between a first position (left rated output position α) and a second position (right end position b), the first position being a position closest to the first end in a range where the optical element is movable with an output (current) within a rated output (rated current) of the drive device, the second position being indicated by the positional information detected by the position detection device and being a position at which the optical element came in contact with the second end.

A calibration method according to Aspect 4 of the present invention is a calibration method for calibrating a movable range R of an optical element (correction lens 11, image sensor 102) moving, with driving force provided by a drive device (actuator coil 13), between a first end (left end 19a) and a second end (right end 19b) symmetrical to the first end with respect to a reference point (center c), the movable range being calibrated on the basis of positional information of the optical element, the positional information being detected at a position detection step, the calibration method including the steps of: (a) receiving the positional information; and (b) calibrating a center of the movable range of the optical element to a center position pa between a first position (left rated output position α) and a second position (right end position b), the first position being a position closest to the first end in a range where the optical element is movable with an output (current) within a rated output (rated current) of the drive device, the second position being indicated by the positional information detected at the position detection step and being a position at which the optical element came in contact with the second end.

An optical element is incorporated into an imaging device or the like together with a driving device or the like which moves the optical element, and moves so as to cancel a vibration. Accordingly, the optical element is used in order to reduce an adverse effect of hand shaking on an imaging function. Generally, an initial position of the optical element is designed so that a center of a movable range of the optical element coincides with a center of a space in which the optical element is stored. However, in some cases, the center of the movable range of the optical element does not coincide as designed with the center of the space due to (a) variations of spring constants or the like of members supporting the optical element, (b) a mounting error which occurs during incorporation of the optical element and the like into the imaging device, (c) external force which acts on the imaging device in which the optical element and the like are incorporated, (d) an aging deterioration, and so forth. In such a case where the center of the movable range of the optical element does not coincide with the center of the space, a portion of a designed movable range of the optical element may be in an unusable region to which the optical element cannot be moved. Further, in a case where a portion of the designed movable range of the optical element is in the unusable region, a current caused to flow in the drive device may exceed a rated output when the drive device attempts to move the optical element to a designed position.

According to the above configuration, it is possible to move the optical element to the center of the movable range with an output within the rated output of the drive device so as to cancel a vibration due to hand shaking. It is also possible to make the unusable region after calibration smaller than that before the calibration, by moving the center of the movable range of the optical element closer to the center of the space in which the optical element is stored. This reduction of the unusable region allows expansion of the movable range of the optical element, so that it is possible to move the optical element so as to cancel a greater vibration.

That is, it is possible to move the optical element with an output within the rated output of the drive device so as to cancel the vibration caused by hand shaking, and to make the unusable region after calibration smaller than that before the calibration.

Note that the optical element can be an image sensor which generates an electric signal upon receipt of light, an optical system which guides light to the image sensor or the like, a correction mechanism which corrects an optical axis of the optical system, a correction lens provided in the correction mechanism, or the like. That is, the calibration device can move the image sensor, the optical system, the correction mechanism, the correction lens, and the like with an output within the rated output of the drive device so as to cancel the vibration due to hand shaking, and also can make the unusable region after calibration smaller than that before the calibration. Furthermore, an object to be moved by the drive device is not limited to the optical element but can be a general movable object.

In Aspect 2 of the present invention, each of the calibration devices 1 and 1A according to Aspect 1 can further include a calibration instruction information generation section (interactive control section 50) for generating information for instructing the center position calibration section to calibrate the center of the movable range of the optical element; and an interface 30 for connecting the calibration instruction information generation section with the center position calibration section.

According to the above configuration, the calibration device can receive the information generated by the calibration instruction information generation section, via the interface from outside, and can calibrate the center of the movable range of the optical element.

Here, the calibration instruction information generation section can have, in addition to a function to generate instruction information for the center position calibration section, an interactive function which allows (i) obtaining, from the center position calibration section, information indicative of whether or not it is necessary to calibrate the center of the movable range of the optical element and providing thus obtained information to a user who operates the calibration instruction information generation section and/or (ii) obtaining information from the center position calibration section as well as supplying information to the center position calibration section, upon receipt of an instruction from a user.

That is, the center of the movable range of the optical element may not coincide as designed with a center of a space in which the optical element is stored, due to (a) variations of spring constants or the like of members supporting the optical element, (b) a mounting error which occurs during incorporation of the optical element and the like into the imaging device, (c) external force which acts on the imaging device in which the optical element and the like are incorporated, (d) an aging deterioration, or the like. Even in such a case where the center of the movable range of the optical element does not coincide as designed with the center of the space, a user of the imaging device or the like in which the calibration device is incorporated can externally operate the calibration device so as to (i) move the optical element with an output within a rated output of the drive device and thereby cancel a vibration due to hand shaking, and (ii) also to make an unusable region after calibration smaller than that before the calibration.

Each of imaging devices 100 and 100A according to Aspect 3 of the present invention is an imaging device including: a housing; a vibration measurement device for measuring a vibration which acts on the housing; an image sensor 102; an optical system (lens 101) for guiding external light L onto the image sensor; and the calibration device as set forth in Aspect 1 or 2, the optical element being moved so that the vibration measured by the vibration measurement device is cancelled and thereby an optical axis of the optical system is corrected.

A method for producing an imaging device according to Aspect 5 of the present invention is a method for producing an imaging device which (i) receives positional information of an optical element detected at a position detection step S103 and (ii) calibrates a movable range R of the optical element (correction lens 11, image sensor 102) moving, with driving force provided by a drive device (actuator coil 13), between a first end (left end 19a) and a second end (right end 19b) symmetrical to the first end with respect to a reference point (center c), the method including the steps of: (c) inspecting whether or not a center p of the movable range of the optical element coincides with the reference point (inspection step S102); and (d) in a case where it is found at the step (c, S102) that the center of the movable range of the optical element does not coincide with the reference point, calibrating the center of the movable range of the optical element to a center position pa between a first position (left rated output position α) and a second position (right end position b), the first position being a position closest to the first end in a range where the optical element is movable with an output (current) within a rated output (rated current) of the drive device, the second position being indicated by the positional information detected at the position detection step and being a position at which the optical element came in contact with the second end (correction lens position calibration step S104).

According to the above configuration, the imaging device includes a calibration function which makes it possible to (i) move the optical element with an output within the rated output of the drive device so as to cancel a vibration due to hand shaking and (ii) also to make the unusable region after calibration smaller than that before the calibration. Thus, the imaging device can reduce an adverse effect of hand shaking on an imaging function.

The use of the production method makes it possible to produce an imaging device that can (i) move an optical element with an output within a rated output of a drive device so as to cancel a vibration due to hand shaking, (ii) also make an unusable region after calibration smaller than that before the calibration, and (iii) in addition, reduce an adverse effect of hand shaking on an imaging function.

The calibration device according to Aspect 1 or 2 of the present invention or the imaging device according Aspect 3 of the present invention can be realized by a computer. In this case, the present invention encompasses a program which causes a computer to operate as the foregoing sections of the calibration device or of the imaging device so that the calibration device or the imaging device can be realized by the computer.

Further, the method for producing the imaging device according to Aspect 7 of the present invention can be realized by a computer. In this case, the present invention encompasses a program which causes a computer to perform the foregoing steps of the method for producing the imaging device so that the method for producing the imaging device can be realized by the computer.

Further, the present invention encompasses a computer-readable storage medium in which each of the above programs is stored.

The present invention is not limited to the description of the embodiments above, but may be altered by a skilled person within the scope of the claims. An embodiment based on a proper combination of technical means disclosed in different embodiments is also encompassed in the technical scope of the present invention. Further, a new technical feature can be formed by combining different technical means disclosed in the embodiments.

INDUSTRIAL APPLICABILITY

The present invention is applicable to an imaging device such as a camera whose imaging function may be adversely affected by hand shaking, and a mobile terminal, such as a smartphone or a personal digital assistant (PDA), including the imaging device.

REFERENCE SIGNS LIST

1 Calibration Device
1A Calibration Device
1B Calibration Device
11 Correction Lens (Optical Element)
13 Actuator Coil (Drive Device)
13a Actuator Coil (Drive Device)
13b Actuator Coil (Drive Device)
15 Position Detection sensor (Position Detection Device)
19a Left End (First End)
19b Right End (Second End)
20 Control Section (Center Position Calibration Section)
30 Interface
50 Interactive Control Section (Calibration Instruction Information Generation Section)
100 Imaging Device
100A Imaging Device
100B Imaging Device
102 Image Sensor (Optical Element)
R Movable Range
Ra Movable Range
S Space
S102 Inspection Step
S103 Position Detection Step
S104 Correction Lens Position Calibration Step (Center Position Calibration Step)
a Left End Position (First End Position)
b Right End Position (Second End Position)
c Center (Reference Point)
p Center
pa Center Position
α Left Rated Output Position
β Right Rated Output Position

The invention claimed is:

1. A calibration device, comprising:
controller circuitry that calibrates a center of a movable range of an optical element to a center position between a first position and a second position; wherein
the calibration device (i) receives positional information of the optical element detected by a position detection device and (ii) calibrates the movable range of the optical element moving, with driving force provided by a drive device, between a first end and a second end symmetrical to the first end with respect to a reference point, the movable range being calibrated on the basis of positional information of the optical element, the first end and the second end each being an inner wall of a housing of the calibration device, and
the controller circuitry calibrates the center of the movable range of the optical element to the center position between the first position and the second position when an initial position of the optical element does not coincide with the reference point, the first position being closer to the first end than to the initial position of the optical element and closest to the first end in a range where the optical element is movable with an output within a rated output of the drive device, the second position being indicated by the positional information detected by the position detection device and being a position at which the optical element comes in contact with the second end.

2. The calibration device as set forth in claim 1, further comprising:
calibration instruction information generation circuitry that generates information for instructing the controller circuitry to calibrate the center of the movable range of the optical element; and
an interface that connects the calibration instruction information generation circuitry with the controller circuitry.

3. An imaging device comprising:
  a housing;
  a vibration measurement device that measures a vibration which acts on the housing;
  an image sensor;
  an optical system that guides external light onto the image sensor; and
  the calibration device as set forth in claim 1, wherein
  the optical element is moved so that the vibration measured by the vibration measurement device is cancelled and thereby an optical axis of the optical system is corrected.

4. A calibration method for calibrating a movable range of an optical element moving, with driving force provided by a drive device, between a first end of a calibration device and a second end of the calibration device symmetrical to the first end with respect to a reference point, the movable range being calibrated on the basis of positional information of the optical element, the positional information being detected at a position detection step, the first end and the second end being an inner wall of a housing of the calibration device, the calibration method comprising:
  in a case where a center of the movable range of the optical element does not coincide with the reference point as a result of an initial position of the optical element having been shifted to a side of the second end from the reference point:
    (a) receiving the positional information; and
    (b) calibrating the center of the movable range of the optical element to a center position between a first position and a second position, the first position being closer to the first end than to the initial position of the optical element and closest to the first end in a range where the optical element is movable with an output within a rated output of the drive device, the second position being indicated by the positional information detected at the position detection step and being a position at which the optical element came in contact with the second end.

5. A calibration device, comprising:
  controller circuitry that extends a portion of a movable range of an optical element; wherein
  the calibration device (i) receives positional information of the optical element detected by a position detection device and (ii) calibrates the movable range of the optical element moving, with a driving force provided by a drive device, between a first end and a second end symmetrical to the first end with respect to a reference point, the movable range being calibrated on the basis of positional information of the optical element, the first end and the second end each being an inner wall of a housing of the calibration device; and
  the controller circuitry, in a case where an initial position of the optical element has been shifted to a side of the second end from the reference point, (i) extends the portion of the movable range of the optical element, the portion extending from a center of the movable range of the optical element toward the first end, so that the optical element is movable to a side of the first end within a rated output of the drive device, and (ii) controls the optical element so that the center of the movable range is closer to the first end than to the initial position of the optical element.

\* \* \* \* \*